(12) United States Patent
Coster et al.

(10) Patent No.: US 10,745,935 B2
(45) Date of Patent: Aug. 18, 2020

(54) ASSEMBLY FOR AN ELECTRONIC LOCKING SYSTEM AND ELECTRONIC LOCKING SYSTEM COMPRISING THE ASSEMBLY

(71) Applicant: ASSA ABLOY AB, Stockholm (SE)

(72) Inventors: Anders Coster, Stockholm (SE); Daniel Skarp, Sundbyberg (SE); Robin McGougan, Bollnas (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/774,054

(22) PCT Filed: Oct. 21, 2016

(86) PCT No.: PCT/EP2016/075337
§ 371 (c)(1),
(2) Date: May 7, 2018

(87) PCT Pub. No.: WO2017/080785
PCT Pub. Date: May 18, 2017

(65) Prior Publication Data
US 2018/0328075 A1 Nov. 15, 2018

(30) Foreign Application Priority Data

Nov. 13, 2015 (EP) ..................................... 15194436

(51) Int. Cl.
*E05B 1/00* (2006.01)
*E05B 7/00* (2006.01)
(Continued)

(52) U.S. Cl.
CPC ............ *E05B 1/003* (2013.01); *E05B 1/0092* (2013.01); *E05B 7/00* (2013.01); *H02K 7/1853* (2013.01);
(Continued)

(58) Field of Classification Search
CPC .......... E05B 1/00; E05B 1/003; E05B 1/0092; E05B 2001/0076; E05B 7/00;
(Continued)

(56) References Cited

U.S. PATENT DOCUMENTS 4,433,355 A * 2/1984 Chew ...................... E05B 63/20
361/172
5,947,535 A * 9/1999 Baker ....................... E05C 1/12
292/165
(Continued)

FOREIGN PATENT DOCUMENTS

CN 101709611 5/2010
CN 202431467 9/2012
(Continued)

OTHER PUBLICATIONS

International Search Report and Written Opinion prepared by the European Patent Office dated Nov. 30, 2016, for International Application No. PCT/EP2016/075337.
(Continued)

*Primary Examiner* — Christopher J Boswell
(74) *Attorney, Agent, or Firm* — Sheridan Ross P.C.

(57) ABSTRACT

Assembly (10) for an electronic locking system (84), the assembly (10) comprising an actuating element (12) rotatably arrangable with respect to a base member (16) for rotation about a first axis (18) and rotatably arranged about a second axis (24) substantially perpendicular to the first axis (18), an electric generator (74) comprising a rotor (76), and a transmission arrangement (82) configured to transmit a rotational actuation of the actuating element (12) about the second axis (24) into a rotation of the rotor (76) of the electric generator (74) to generate electric energy.

20 Claims, 4 Drawing Sheets

(51) Int. Cl.
*E05B 47/00* (2006.01)
*H02K 7/18* (2006.01)

(52) U.S. Cl.
CPC ............... *E05B 2001/0076* (2013.01); *E05B 2047/0062* (2013.01)

(58) Field of Classification Search
CPC ..... E05B 2047/0048; E05B 2047/0057; E05B 2047/0062
See application file for complete search history.

(56) References Cited

U.S. PATENT DOCUMENTS

| | | | | |
|---|---|---|---|---|
| 6,141,998 | A * | 11/2000 | Seo | E05B 1/0092 70/224 |
| 6,911,897 | B2 * | 6/2005 | Miller | E05B 37/00 340/5.55 |
| 8,581,690 | B2 * | 11/2013 | Lappalainen | E05B 47/0611 340/3.1 |
| 8,733,022 | B2 * | 5/2014 | Sonnek | E05B 83/01 49/280 |
| 8,981,899 | B2 * | 3/2015 | Pukari | E05B 47/063 340/5.73 |
| 9,394,723 | B1 * | 7/2016 | Roth | E05B 27/006 |
| 9,447,610 | B2 * | 9/2016 | Ou | E05B 63/006 |
| 10,240,362 | B2 * | 3/2019 | Ou | E05B 13/10 |
| 2010/0140499 | A1 | 6/2010 | Casale | |
| 2014/0225375 | A1 | 8/2014 | Chang | |
| 2016/0160531 | A1 * | 6/2016 | Piirainen | E05B 47/0012 74/411.5 |
| 2018/0298639 | A1 * | 10/2018 | Rais | E05B 47/0001 |
| 2019/0032365 | A1 * | 1/2019 | Vergani | E05B 15/0033 |
| 2020/0002970 | A1 * | 1/2020 | Adriano | E05B 1/0092 |

FOREIGN PATENT DOCUMENTS

| | | |
|---|---|---|
| CN | 203271285 | 11/2013 |
| GB | 2495848 | 4/2013 |

OTHER PUBLICATIONS

Official Action with English Summary for China Patent Application No. 201680065888.4, dated Jun. 20, 2019, 6 pages.

* cited by examiner

ASSEMBLY FOR AN ELECTRONIC LOCKING SYSTEM AND ELECTRONIC LOCKING SYSTEM COMPRISING THE ASSEMBLY

CROSS REFERENCE TO RELATED APPLICATIONS

This application is a national stage application under 35 U.S.C. 371 and claims the benefit of PCT Application No. PCT/EP2016/075337 having an international filing date of 21 Oct. 2016, which designated the United States, which PCT application claimed the benefit of European Patent Application No. 15194436.0 filed 13 Nov. 2015, the disclosure of each of which are incorporated herein by reference.

TECHNICAL FIELD

The present disclosure generally relates to an assembly for an electronic locking system. In particular, an assembly for an electronic locking system and an electronic locking system comprising the assembly are provided.

BACKGROUND

Various types of electronic locking systems are known. Instead of utilizing a purely mechanical lock, some locking systems include an electronic drive of a lock member (e.g. a lock bolt) to unlock, for example, a door to give access to the area behind the door.

Furthermore, instead of utilizing a traditional key to unlock the door, various types of electronic communication methods for authorizing a person to access the area behind the door are known. For example, a Radio Frequency Identification (RFID) system may be used where a reader of the RFID system is installed in the door and a tag is carried by or attached to an object to be identified.

In order to power an electronic locking system, so called "self-powered" electronic locking systems have been proposed, where electricity is generated by a mechanical actuation of a door handle and is used to power the electronic locking system. This concept is also known as energy harvesting.

US 2014/0225375 A1 discloses a power supply device for a door handle. By turning a door handle to move a latch, a rotation shaft of the door handle is driven to turn a drive gear. The rotation of the drive gear is transmitted to a rotation of a generator shaft to generate power for an electric lock. Drawbacks of the device in US 2014/0225375 A1 include a bulky structural design and that the device is complicated to install in a door.

SUMMARY

One object of the present disclosure is to provide an assembly that enables new operational principles of an actuating element to be used in connection with an electronic locking system. For example, the power supply device in US 2014/0225375 A1 only captures energy from one type of movement of the door handle.

A further object of the present disclosure is to provide an assembly for an electronic locking system with a simple, reliable and compact design.

A still further object of the present disclosure is to provide an assembly for an electronic locking system with an effective generation of electric energy.

According to one aspect, an assembly for an electronic locking system is provided, where the assembly comprises an actuating element rotatably arrangable with respect to a base member for rotation about a first axis and rotatably arranged about a second axis substantially perpendicular to the first axis, an electric generator comprising a rotor, and a transmission arrangement configured to transmit a rotational actuation of the actuating element about the second axis into a rotation of the rotor of the electric generator to generate electric energy. The electronic locking system may also be referred to as an electromechanical lock.

The actuating element may be constituted by a handle. The handle may be of any type for being grasped by hand. The handle may or may not have an elongated appearance. Moreover, the actuating element may be rotatably arrangable with respect to the base member for rotation about a first axis to open or close a movable access member.

The assembly thus allows the actuating element to either be pushed towards the base member (i.e. rotated about the second axis in one direction) to generate electric energy or to be pulled away (i.e. rotated about the second axis in the other direction) from the base member to generate electric energy. The transmission arrangement may however be configured to transmit both a rotational actuation of the actuating element about the second axis in a first direction and a rotational actuation of the actuating element about the second axis in a second direction, opposite to the first direction, into a rotation of the rotor of the electric generator to generate electric energy.

The extra energy from the push/pull action of the actuating element may be used to generate electric energy regardless of whether or not the actuating element is actuated about the first axis (e.g. turned to open or close a movable access member).

The base member may be constituted by a connector plate, a frame member or similar attachable to a movable access member, such as a door or gate. Thus, the assembly according to the present disclosure may comprise the base member.

Alternatively, the base member may be constituted by the movable access member. The actuating element may then be rotatably arranged with respect to the movable access member for rotation about the first axis.

The actuating element may have a longitudinal appearance. A free end of the actuating element may be arranged opposite to the second axis with respect to the first axis. In other words, the first axis may be arranged between the free end of the actuating element and the second axis.

The assembly may comprise a base bearing for rotatably arranging the actuating element with respect to the base member for rotation about the first axis. The base bearing may be constituted by a roller bearing.

If the base member is constituted by a door, or by a connector plate, a frame member or similar attached to a door, the first axis may be arranged substantially perpendicular to the main door surface. Thus, a rotation of the actuating element about the first axis may be carried out in a plane substantially parallel with the main door surface. Correspondingly, a rotation of the actuating element about the second axis may be carried out in a plane substantially perpendicular to the main door surface. The actuating element can also be actuated simultaneously about the first axis and the second axis.

Thus, when the actuating element is rotatably arranged with respect to the base member, the actuating element can be actuated in two different planes. The actuating element can be actuated up and down in a first plane perpendicular to the first axis (this is the plane in which most conventional door handles are actuated). Moreover, the actuating element can be actuated inwards and outwards in a second plane perpendicular to the second axis. For example, the actuating element may be actuated inwards and/or outwards (rotated about the second axis) to generate electric energy and be actuated downwards and/or upwards (rotated about the first axis) to mechanically control a latch bolt of a door (the downwards/upwards actuation may be the conventional handle actuation when opening a door).

The actuating element may be oriented substantially horizontal when in a neutral position (i.e. an unactuated position). The actuating element may be configured to rotate between 30° and 40°, such as 36°, about the first axis, when the actuating element is rotatably arranged with respect to the base member.

Furthermore, the actuating element may be configured to rotate between 20° and 40°, such as 30°, from the neutral position in one or both directions about the second axis. If the base member is constituted by a door, or by a connector plate, a frame member or similar attached to a door, the actuating element may be oriented substantially parallel with the door in the neutral position. The assembly may be configured to spring back the actuating element to the neutral position (from an actuation about the first axis and/or the second axis), for example by means of a spring mechanism.

The substantially perpendicular relationship between the first axis and the second axis may include angles from 85° to 95°, such as from 88° to 92°. Although the first axis and the second axis are substantially perpendicular, the first axis and the second axis do not need to be positioned in a common plane, i.e. the first axis and the second axis may be offset.

Throughout the present disclosure, a substantially perpendicular relationship may include a relative angle of from 85° to 95°, such as from 88° to 92°, and a substantially parallel relationship and a substantially coincident relationship may include a relative angle of up to 5°, such as up to 2°. Similarly, a line arranged substantially in a plane may include a relative angle of the line to the plane of up to 5°, such as up to 2°. A substantially horizontal orientation may include a relative angle of up to 5°, such as up to 2°, with respect to a perfectly horizontal line.

The electric generator may be arranged within the assembly such that a rotational axis of the rotor is substantially parallel or substantially coincident with the first axis. The electric generator may be housed inside a bushing. The electric generator may be bidirectional, i.e. configured to generate electric energy from two rotational directions of the rotor. The assembly may further include an energy storage device for storing electric energy generated by the electric generator.

The transmission arrangement may be configured to transmit a rotational actuation of the actuating element about the first axis into a rotation of the rotor of the electric generator to generate electric energy. With this variant, the actuating element can be actuated to generate electric energy both with an actuation about the first axis and with an actuation about the second axis.

Additional electric energy can be generated by the rotor of the electric generator if the actuating element is actuated both about the first axis and about the second axis. For example, the actuating element can be simultaneously turned down and "pulled".

The assembly may further comprise a housing rotationally coupleable to the base member for rotation about the first axis. The housing, which may alternatively be referred to as a casing, may have a substantially cylindrical appearance with a longitudinal axis substantially coincident with the first axis. The housing may comprise a proximal or back (i.e. closer to the actuating element) main portion and a distal or forward (i.e. closer to the base member) connecting portion.

The housing may be rotationally coupled to the base member by means of the base bearing. Thus, prior to being rotationally coupled to the base member, the housing is rotationally coupleable to the base member. However, the base member is still rotationally coupleable to the base member when the coupling has been established. The connecting portion of the housing may be connected to the base bearing. For example, if the base bearing is constituted by a roller bearing, the connecting portion of the housing may be connected to an inner race of the roller bearing and the base member may be connected to an outer race of the roller bearing.

A slot structure may be provided in the connecting portion for allowing the electric generator to be fixedly connected to the base member and for allowing the housing to be rotated about the first axis relative to the base member. In case the connecting portion is substantially cylindrical, the slot structure may comprise at least one longitudinal slot for receiving one or more radially inwardly protruding mounting lugs on the base member. The longitudinal slot thus extends substantially parallel with the longitudinal extension axis of the connecting portion. Thereby, the housing can be mounted to an inner race of a base bearing inside the base member and the electric generator can be fixed to the base member.

Each longitudinal slot may branch into a circumferential slot. For example, a longitudinal slot may branch into a circumferential slot to form a T-shape. The circumferential extension of the slot may substantially correspond to, or define, the maximum angular rotation of the actuating element about the first axis, e.g. 36°. The slot structure may for example comprise three sets of longitudinal slots and circumferential slots. In this case, the base member may comprise three radially inwardly protruding mounting lugs positioned at angular positions corresponding to the longitudinal slots.

The actuating element may be rotationally locked to the housing about the first axis. Thus, by actuating the actuating element with a rotation about the first axis (e.g. turning the actuating element downwards), the actuating element rotates together with the housing about the first axis.

Alternatively, or in addition, the actuating element may be rotationally coupled to the housing for rotation about the second axis. The actuating element may for example be hingedly connected to the housing with a hinge member having a rotational axis constituting the second axis. The actuating element may cross the first axis and extend to the second axis at a far region of the housing. Since the housing rotates when the actuating element is rotated about the first axis (if the actuating element is rotationally locked to the housing for rotation about the first axis) also the second axis is rotated about the first axis.

The transmission arrangement may comprise an input shaft comprising an engageable structure and the actuating element may comprise at least one engaging member for engaging the engageable structure to translate an actuation of the actuating element about the second axis into a rotation of the input shaft about the first axis.

The input shaft may be concentric to the first axis. The at least one engaging member may be provided between the second axis and a free end of the actuating element.

For example, if the actuating element is "pulled" backward to rotate about the second axis, the at least one engaging member is forced to move substantially backward (more specifically, along a circular path having a directional component parallel with, or concentric with the first axis). This backward movement of the at least one engaging member and the engagement with the engageable structure forces the input shaft to rotate about the first axis. The input shaft then drives the rotor of the electric generator, either directly or, for example, via an intermediate gearing arrangement.

The engageable structure may be constituted by at least one guide groove. In this case, the input shaft may be constituted by, or have an appearance of, a screw. Thus, a substantially forward movement of the engaging member (e.g. during a push of the actuating element such that the actuating element is rotated about the second axis) along the guide groove is translated into a rotational movement of the input shaft about the first axis in a first direction. Conversely, a substantially backward movement of the engaging member (e.g. during a pull of the actuating element such that the actuating element is rotated about the second axis) along the guide groove is translated into a rotational movement of the input shaft about the first axis in a second direction, opposite to the first direction.

Each of the at least one engaging member may comprise a pin. Each pin may be rigidly attached to the actuating element. Additionally, each pin may be integrally formed with the actuating element.

The assembly may comprise two engaging members and each pin may be arranged substantially in a plane comprising the second axis and having the first axis as a normal. For example, the two pins may be provided along an axis substantially parallel with, but offset to, the second axis. As another example, the two pins may be provided along an axis substantially perpendicular to the second axis.

Each of the at least one engaging member may comprise a bearing for engaging the engageable structure. Each bearing may be constituted by a roller bearing. The bearing thereby allows relative rotation between the engaging member and the engageable structure.

The assembly may further comprise an output shaft and a gearing arrangement between the input shaft and the output shaft configured to increase the rotational speed of the output shaft with respect to the rotational speed of the input shaft. The gearing arrangement may have a ratio of from 1:8 to 1:12, such as 1:10.

According to one variant, the gearing arrangement is constituted by a planetary gearing. The input shaft may be coupled to a planetary carrier of the planetary gearing and the output shaft may be coupled to a sun gear of the planetary gearing. The ring gear may be held stationary with respect to, or may be constituted by, a bushing. The ring gear, the electric generator and the bushing may be fixed to the base member.

The transmission arrangement may comprise a flywheel for driving the rotor of the electric generator and a freewheel arranged to engage the flywheel. Thereby, peaks in the rotational speed of the freewheel can be eliminated. The freewheel may be coupled directly to the input shaft. Alternatively, the freewheel may be coupled to the output shaft of the gearing arrangement.

The freewheel may be of various different types. In case the freewheel is coupled to the output shaft of the gearing arrangement, the freewheel may disengage the output shaft from the flywheel when the output shaft has a lower rotational speed than the flywheel, when the output shaft is stopped or when the output shaft rotates in a direction opposite to the rotational direction of the flywheel. One suitable type of freewheel comprises one-way teeth, a so called ratchet freewheel. In case the gearing arrangement is constituted by a planetary gearing, the freewheel may be directly attached to, or integrally formed with, the sun gear. In this case, an output shaft of the gearing arrangement may be dispensed with.

Also the flywheel may be of various different types for storing rotational energy. The flywheel may be fixedly attached, for example directly attached, to the rotor of the electric generator.

However, it is also possible to omit the flywheel if the rotor of the electric generator has a sufficient moment of inertia. In this case, the freewheel may be arranged to directly engage the rotor of the electric generator.

With a freewheel, the rotor of the electric generator can only be driven in one direction. Thus, the transmission arrangement may be configured to either transmit a rotational actuation of the actuating element about the second axis in a first direction (e.g. a push of the actuating element) or to transmit a rotational actuation of the actuating element about the second axis in a second direction (e.g. a pull of the actuating element), opposite to the first direction, into a rotation of the rotor of the electric generator to generate electric energy. These configurations may for example be accomplished by designing the engageable structure on the input shaft accordingly.

Similarly, with the freewheel, the transmission arrangement may be configured to either transmit a rotational actuation of the actuating element about the first axis in a first direction (e.g. a downward turn) or to transmit a rotational actuation of the actuating element about the first axis in a second direction (e.g. an upward turn), opposite to the first direction, into a rotation of the rotor of the electric generator to generate electric energy.

Thus, the transmission arrangement may comprise a freewheel and may be configured to rotate the rotor of the electric generator with any of the following groups of movements: pull and downward turn of the actuating element, push and downward turn of the actuating element, pull and upward turn of the actuating element, and push and upward turn of the actuating element.

However, the transmission arrangement may alternatively comprise a bidirectional electric generator and no freewheel or flywheel. For example, the rotor of the electric generator may be driven directly by an output shaft of the gearing arrangement. In this case, the transmission arrangement may be configured to rotate the rotor with each of a pull, push, downward turn and upward turn of the actuating element.

The actuating element may have a substantially elongated appearance. For example, the actuating element may be constituted by a handle or lever. The second axis may be provided at one end of the handle, opposite to a free end of the handle. At the free end, the handle may include a curved section, for example curved 80° with respect to a substantial extension direction of the handle.

The assembly may further comprise the base member and the actuating element may be rotatably arranged with respect to the base member for rotation about the first axis. Two assemblies according to the present disclosure may be installed at opposite sides of an access member, such as a door. The structural configurations of the assemblies may be mirrored in a substantial extension plane of the access member. The two assemblies may be attached to a common base member, or to different, i.e. dedicated, base members.

According to a further aspect, there is provided an electronic locking system comprising an assembly according to the present disclosure and an electronic access control device powerable by the electric generator.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
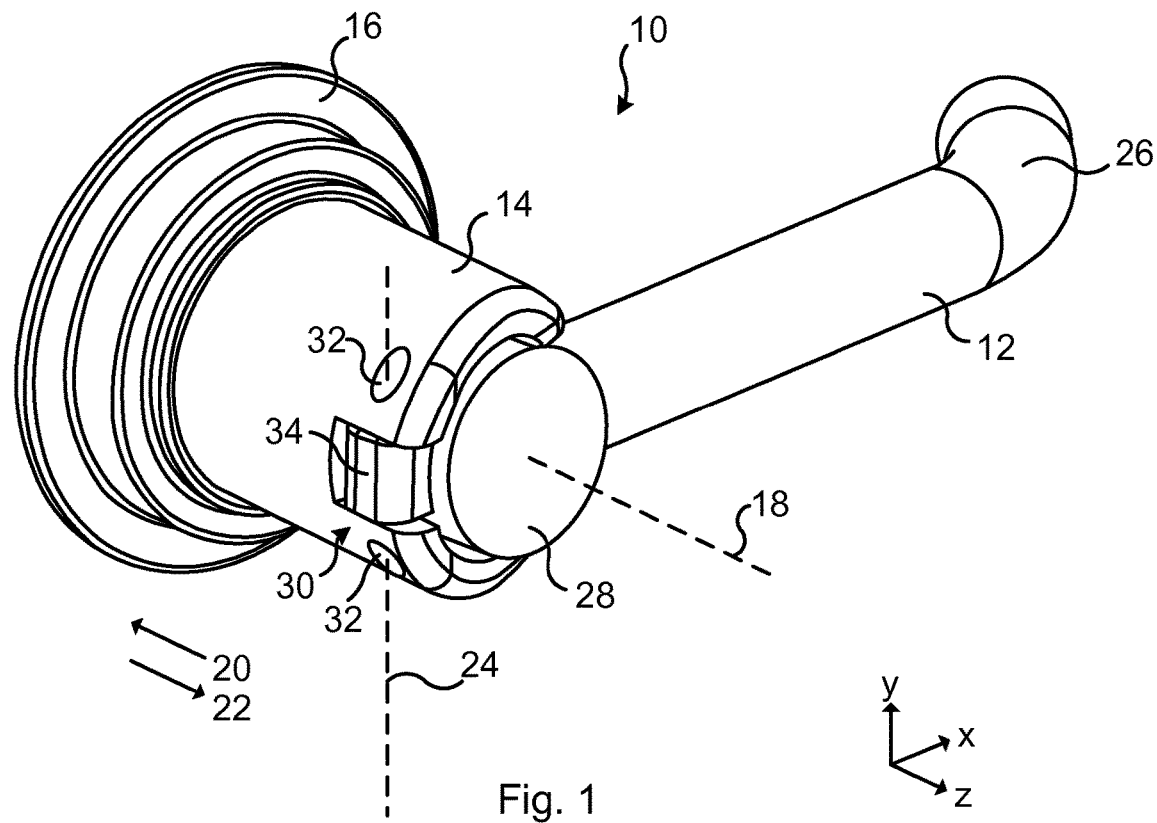
FIG. 1 schematically represents a perspective view of an assembly for an electronic locking system where an actuating element is in a neutral position.

FIG. 1 schematically represents a perspective view of an assembly 10 for an electronic locking system. The assembly 10 comprises an actuating element 12 and a housing 14. In FIG. 1, the actuating element 12 is rotatably arranged with respect to a base member 16 for rotation about a first axis 18. The assembly 10 in FIG. 1 also comprises the base member 16. Arrow 20 indicates a distal or forward direction and arrow 22 indicates a proximal or backward direction.

The actuating element 12 is also rotationally arranged about a second axis 24, perpendicular to the first axis 18. The first axis 18 and the second axis 24 are perpendicular to each other but are arranged in different planes, i.e. the first axis 18 and the second axis 24 are offset. In FIG. 1, the actuating element 12 is in a neutral, unactuated position with respect to the first axis 18 and the second axis 24.

FIG. 1 contains a (xyz) Cartesian coordinate system for the assembly 10. The x-axis is parallel with an extension direction of the actuating element 12 in the neutral, unactuated position shown in FIG. 1. The y-axis is parallel with the second axis 24 in the state shown in FIG. 1. The z-axis is parallel with the first axis 18. The first axis 18 and the second axis 24 are offset from each other, i.e. distanced from each other, in the x-axis direction. The forward direction 20 and the backward direction 22 are parallel with the z-axis.

The actuating element 12 can be constituted by a handle. In FIG. 1, the actuating element 12 is a handle with an elongated appearance (extending parallel with the x-axis). However, alternative shapes and types of actuating element 12 are conceivable. The actuating element 12 in FIG. 1 comprises a free end 26 and a base portion 28 at an end opposite to the free end 26. The base portion 28 has a substantially cylindrical appearance with a closed spherical end. The first axis 18 is arranged between the free end 26 of the actuating element 12 and the second axis 24.

At the free end 26, the actuating element 12 includes a curved section. The curved section is curved approximately 80° with respect to a substantial extension direction of the actuating element 12. The curved section is curved in towards the base member 16 in a plane comprising the first axis 18 and having the second axis 24 as a normal (i.e. in a plane parallel with the xz-plane).

The design of the actuating element 12 is merely one possible variant. For example, the curved section may be omitted such that the actuating element 12 is substantially straight from the base portion 28 to (and including) the free end 26.

The base member 16 is in FIG. 1 exemplified with a connector plate having a circular appearance. However, the base member 16 may have a wide range of alternative shapes, including shapes with a square or triangular appearance. The base member 16 is configured to be attached to a movable access member (not shown), such as a door. The first axis 18 is concentric with the base member 16 such that the first axis 18 is arranged perpendicular to a main door surface (e.g. parallel with the xy-plane) when the base member 16 is attached to a door.

The actuating element 12 is thus arranged to be actuated clockwise (from the neutral position) and counterclockwise (back to the neutral position) about the first axis 18 and arranged to be actuated inwards (i.e. pushed in the forward direction 20) and outwards (i.e. pulled in the backward direction 22) about the second axis 24. In case the base member 16 is attached to a door, the actuating element 12 is arranged to be actuated about the first axis 18 in a plane parallel with the main door surface (i.e. in a plane parallel with the xy-plane in case the actuating element 12 is not actuated about the second axis 24) and arranged to be actuated about the second axis 24 in a plane perpendicular to the main door surface (i.e. in a plane parallel with the xz-plane in case the actuating element 12 is not actuated about the first axis 18). The actuating element 12 can also be simultaneously actuated about the first axis 18 and the second axis 24.

In FIG. 1, the housing 14 is rotationally coupled to the base member 16 for rotation about the first axis 18. Prior to coupling the housing 14 to the base member 16, the housing 14 is referred to as rotationally coupleable to the base member 16 for rotation about the first axis 18. However, also when the coupling between the housing 14 and the base member 16 has been established, the housing 14 is still referred to as coupleable to the base member 16. The housing 14 has a substantially cylindrical appearance with a longitudinal axis substantially conforming to the first axis 18.

The assembly 10 further comprises a hinge member 30 between the actuating element 12 and the housing 14. The hinge member 30 allows a rotation of the actuating element 12 relative to the housing 14 about the second axis 24. In FIG. 1, the hinge member 30 is exemplified by two bores 32 in the housing 14, a lug 34 on the actuating element 12 positioned between the bores 32, and a pin (not shown) through the bores 32 and the lug 34. However, alternative configurations of the hinge member 30 are conceivable.

The actuating element 12 is thereby rotationally locked to the housing 14 about the first axis 18. Thus, if the actuating element 12 is actuated about the first axis 18, also the housing 14 rotates about the first axis 18

In FIG. 1, the actuating element 12 is also rotationally coupled to the housing 14 for rotation about the second axis 24. Thus, if the actuating element 12 is actuated about the second axis 24, the housing 14 does not rotate about the second axis 24. However, it is possible to rotationally couple the actuating element 12 to the housing 14 for rotation about the second axis 24 without rotationally locking the actuating element 12 to the housing about the first axis 18.

Figure 2:
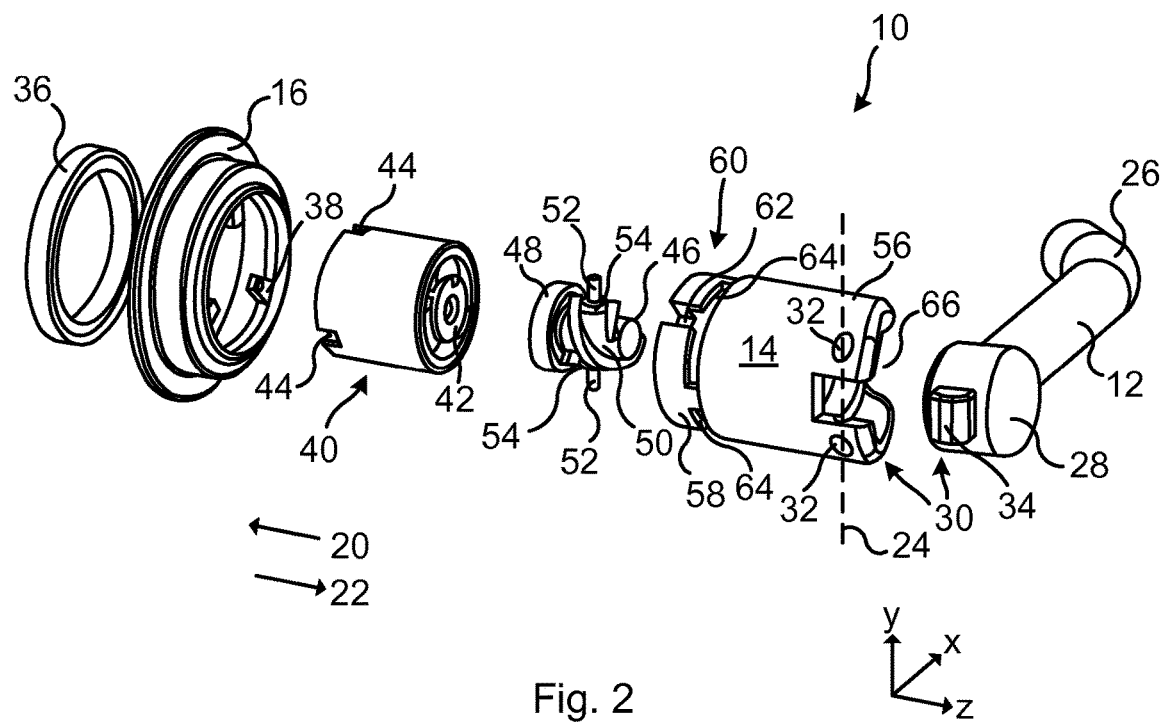
FIG. 2 schematically represents an exploded view of the components of the assembly.

FIG. 2 schematically represents an exploded view of the components of the assembly 10. To the left in FIG. 2 is shown a base bearing 36, exemplified as a roller bearing. The base bearing 36 is configured to be attached with its outer race fixed to an inner circumference of the base member 16.

The base member 16 comprises three mounting lugs 38. The mounting lugs 38 each protrudes radially inwards from the base member 16 and are evenly distributed around the inner circumference of the base member 16, i.e. angularly displaced with 120°. The number and angular distribution of the mounting lugs 38 shown in FIG. 2 are merely one example. Additional or fewer mounting lugs 38 can be provided. The angular distribution can also be varied as needed.

A bushing 40 with a cylindrical appearance houses an electric generator (not shown), a freewheel (not shown), a flywheel (not shown) and gearing arrangement 42, here implemented as a planetary gearing. The bushing 40 comprises three notches 44 arranged to receive the mounting lugs 38 of the base member 16 therein to fix the base member 16 to the bushing 40, for example by means of screws.

The assembly 10 further comprises an input shaft 46. A shaft bearing 48 is attached to a distal region of the input shaft 46. The shaft bearing 48 is used to rotationally couple the input shaft 46 to the housing 14 for relative rotation inside the housing 14 about the first axis 18.

The input shaft 46 comprises an engageable structure 50. Two engaging members 52, each in the form of a pin, are engaged with the engageable structure 50. The engageable structure 50 is constituted by two guide grooves, each engaged by one engaging member 52. In FIG. 2, each guide groove has a spiral form. The input shaft 46 thereby has an appearance of a screw. The engageable structure 50 and the engaging members 52 may however adopt various alternative forms. For example, the engageable structure 50 may be constituted by one or more cam surfaces and the engaging members 52 may be constituted by one or more cam followers for engaging a respective cam surface.

As can be seen in FIG. 2, each engaging member 52 comprises a bearing 54 in the form of a roller bearing engaging the engageable structure 50. With the bearings 54, a relative rotation between the engaging member 52 and the engageable structure 50 is allowed.

In use of the assembly 10, each engaging member 52 is fixedly attached to, or integrated with, the actuating element 12. Each engaging member 52 may be arranged to protrude radially inwards from the base portion 28. The engaging members 52 may be arranged in a plane comprising the second axis 24 and having the first axis 18 as a normal (i.e. in a plane parallel with the xy-plane). For example, each engaging member 52 may be arranged parallel with, but offset to, the second axis 24.

The cooperation of the engaging member 52 with the engageable structure 50 allows a movement of the engaging members 52 in a direction comprising a directional component in the forward direction 20 to be translated into a rotation of the input shaft 46 in a counterclockwise direction, as seen in the forward direction 20. Similarly, the cooperation of the engaging member 52 with the engageable structure 50 allows a movement of the engaging members 52 in a direction comprising a directional component in the backward direction 22 to be translated into a rotation of the input shaft 46 in a clockwise direction, as seen in the forward direction 20.

In case the engaging members 52 are rotated in a plane having the first axis 18 as a normal (i.e. in a plane parallel with the xy-plane), the engaging members 52 also engage the engageable structure 50 to rotate the input shaft 46 in a corresponding direction, and with a corresponding amount, about the first axis 18.

The housing 14 comprises a proximal main portion 56 and a distal connecting portion 58. Both the main portion 56 and the connecting portion 58 have a cylindrical appearance, but the connecting portion 58 has a slightly smaller outer diameter and a shorter longitudinal extension with respect to the main portion 56. The main portion 56 has a length of approximately four times the length of the connecting portion 58.

The outer periphery of the connecting portion 58 corresponds to the inner diameter of the base bearing 36. Thus, by attaching the connecting portion 58 to the inner race of the base bearing 36, the housing 14 can be rotationally coupled to the base member 16 for rotation about the first axis 18.

The housing 14 further comprises a slot structure 60 in the connecting portion 58. The slot structure 60 comprises three longitudinal slots 62 (only one seen in FIG. 2) extending in a direction substantially parallel with the first axis 18. Each longitudinal slot 62 is open to a distal end of the housing 14 for receiving a corresponding mounting lug 38 of the base member 16.

The longitudinal slots 62 of the slot structure 60 branch into a respective circumferential slot 64. The circumferential slots 64 are arranged in a circumferential direction of the connecting portion 58. Thus, each pair of longitudinal slot 62 and circumferential slot 64 forms a T-shape. The mounting lugs 38 of the base member 16 are allowed to move inside a respective circumferential slot 64 as the housing 14 is rotated relative to the base member 16 about the first axis 18. Since the housing 14 is allowed to rotate relative to the base member 16 about the first axis 18, this rotation can be used to drive the mechanical parts of a lock, e.g. to mechanically control a latch bolt of a door. At the same time, a rotation of the actuating element 12 about the first axis 18 can be used to turn the input shaft 46 to generate electric energy.

In this implementation, each circumferential slot 64 has an angular extension of 36°. Thus, the maximum angular rotation of the actuating element 12 about the first axis 18 is also 36°. Moreover, the slot structure 60 allows the electric generator (not shown) inside the bushing 40 to be fixedly connected to the base member 16 and at the same time allows the housing 14 to be rotated about the first axis 18, relative to the base member 16.

An aperture 66 is formed in a proximal region of the main portion 56 of the housing 14. The aperture 66 allows the actuating element 12 to be pushed to rotate about the second axis 24 relative to the housing 14.

Figure 3:
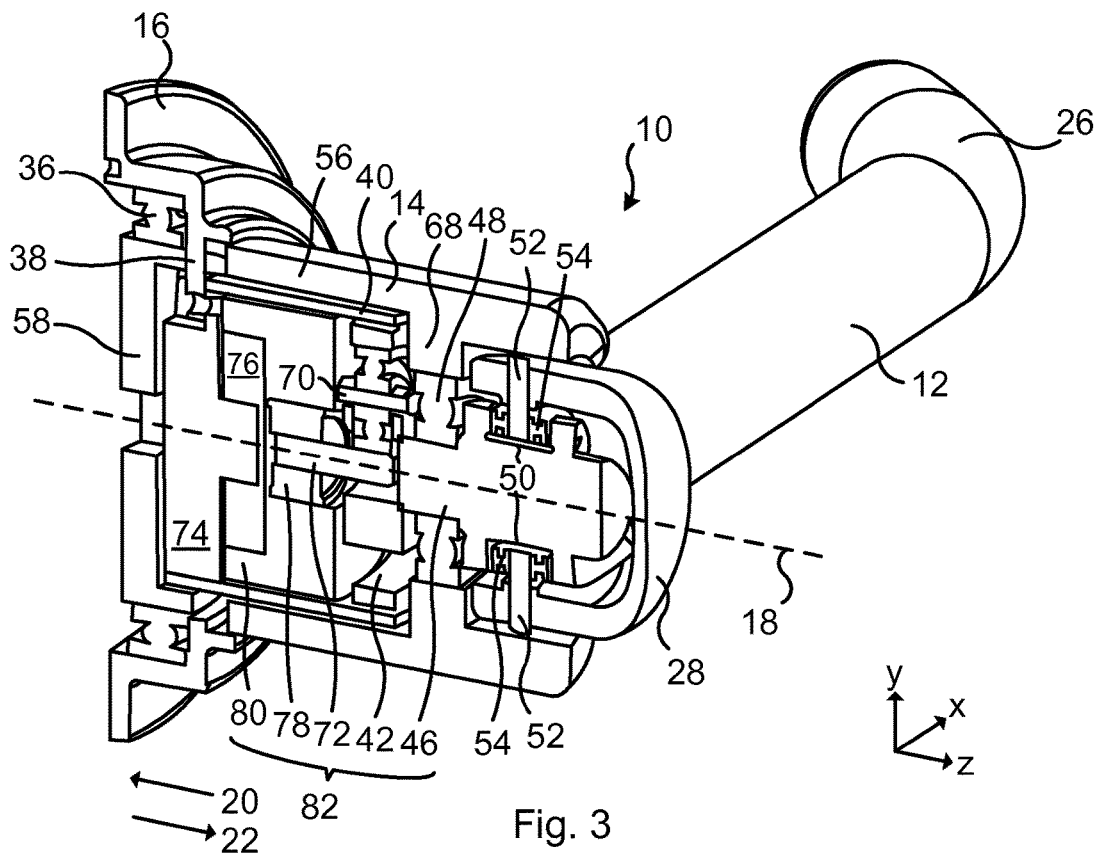
FIG. 3 schematically represents a cross sectional perspective view of the assembly where the actuating element is in the neutral position.

FIG. 3 schematically represents a cross sectional perspective view of the assembly 10 where the actuating element 12 is in the neutral position. FIG. 3 shows the assembly 10 in a mounted state ready for use.

The engaging member 52 are fixedly attached to the base portion 28 of the actuating element 12 and extend in a direction parallel with, but offset to the second axis 24 (not shown in FIG. 3). A substantial part (approximately 70%) of the input shaft 46 is housed inside the base portion 28.

The main portion 56 of the housing 14 comprises a radially inwardly protruding collar or wall 68. The shaft bearing 48 is attached to this wall 68 such that the input shaft 46 is rotatably arranged for rotation about the first axis 18 relative to the housing 14 but is axially fixed relative to the housing 14.

The gearing arrangement 42 is a planetary gearing comprising a sun gear, three planetary gears, a planetary carrier 70 and a ring gear. The input shaft 46 is fixedly attached to the planetary carrier 70. The sun gear is attached to an output shaft 72. The ring gear is constituted by the interior of the bushing 40.

As the input shaft 46 rotates, the planetary carrier 70 attached to the input shaft 46 is also rotated to drive the planetary gears inside the ring gear to rotate the sun gear and thereby also the output shaft 72. The gearing arrangement 42 has a ratio of 1:10 such that the rotational speed of the output shaft 72 is ten times the rotational speed of the input shaft 46. The ratio may be varied depending on the requirements, dimensions etc. of the assembly 10.

In FIG. 3, it can be seen that an electric generator 74 with a rotor 76, a freewheel 78 and a flywheel 80 are arranged inside the bushing 40. The electric generator 74 is fixed to the bushing 40 and thereby also to the base member 16.

The freewheel 78 is attached to the output shaft 72 and is arranged to engage the flywheel 80. More specifically, the freewheel 78 is arranged to disengage the output shaft 72 from the flywheel 8o when the output shaft 72 has a lower rotational speed than the flywheel 80, when the output shaft 72 is stopped or when the output shaft 72 rotates in a direction opposite to the rotational direction of the flywheel 80. The flywheel 80 is attached to and arranged to drive the rotor 76 of the electric generator 74.

In FIG. 3, the input shaft 46, the gearing arrangement 42, the output shaft 72, the freewheel 78 and the flywheel 80 constitute a transmission arrangement 82. The transmission arrangement 82 is thus configured to transmit (i.e. translate) a rotational actuation of the actuating element 12 about the second axis 24 into a rotation of the rotor 76 of the electric generator 74 to generate electric energy.

Although the gearing arrangement 42 can be implemented as a planetary gearing, other implementations are possible. Furthermore, the gearing arrangement 42 may be omitted. Thus, the transmission arrangement 82 may comprise a gearing arrangement 42 other than a planetary gearing or may not comprise any gearing arrangement 42. Alternatively, or in addition, the freewheel 78 and/or the flywheel 80 may be omitted. For example, the rotor 76 of the electric generator 74 may function as a flywheel if the rotor 76 has a sufficient moment of inertia. It is also possible to couple the input shaft 46 directly to the rotor 76 of the electric generator 74. In this case, the electric generator 74 may be bidirectional such that the mechanical energy of each of a push, pull, downward turn and upward turn of the actuating element 12 can be converted to electric energy.

Thus, the transmission arrangement 82 may be constituted by the input shaft 46 and optionally one or more of the gearing arrangement 42, the output shaft 72, the freewheel 78 and the flywheel 80. However, as mentioned above, also the input shaft 46 is merely one example and alternative designs or structural components are conceivable to transmit a rotational actuation of the actuating element 12 about the second axis 24 into a rotation of the rotor 76 of the electric generator 74 to generate electric energy.

Moreover, if the actuating element 12 is turned to rotate about the first axis 18 but not rotated about the second axis 24 (i.e. merely actuated in a plane parallel with the xy-plane), the rotational actuation of the actuating element 12 about the first axis 18 is translated into a corresponding rotation (i.e. a rotation with the same angular displacement) of the input shaft 46. During this movement of the actuating element 12, the engaging members 52 are substantially fixed with respect to the engageable structure 50 of the input shaft 46. Thus, the transmission arrangement 82 is also configured to transmit a rotational actuation of the actuating element 12 about the first axis 18 into a rotation of the rotor 76 of the electric generator 74 to generate electric energy.

Figure 4:
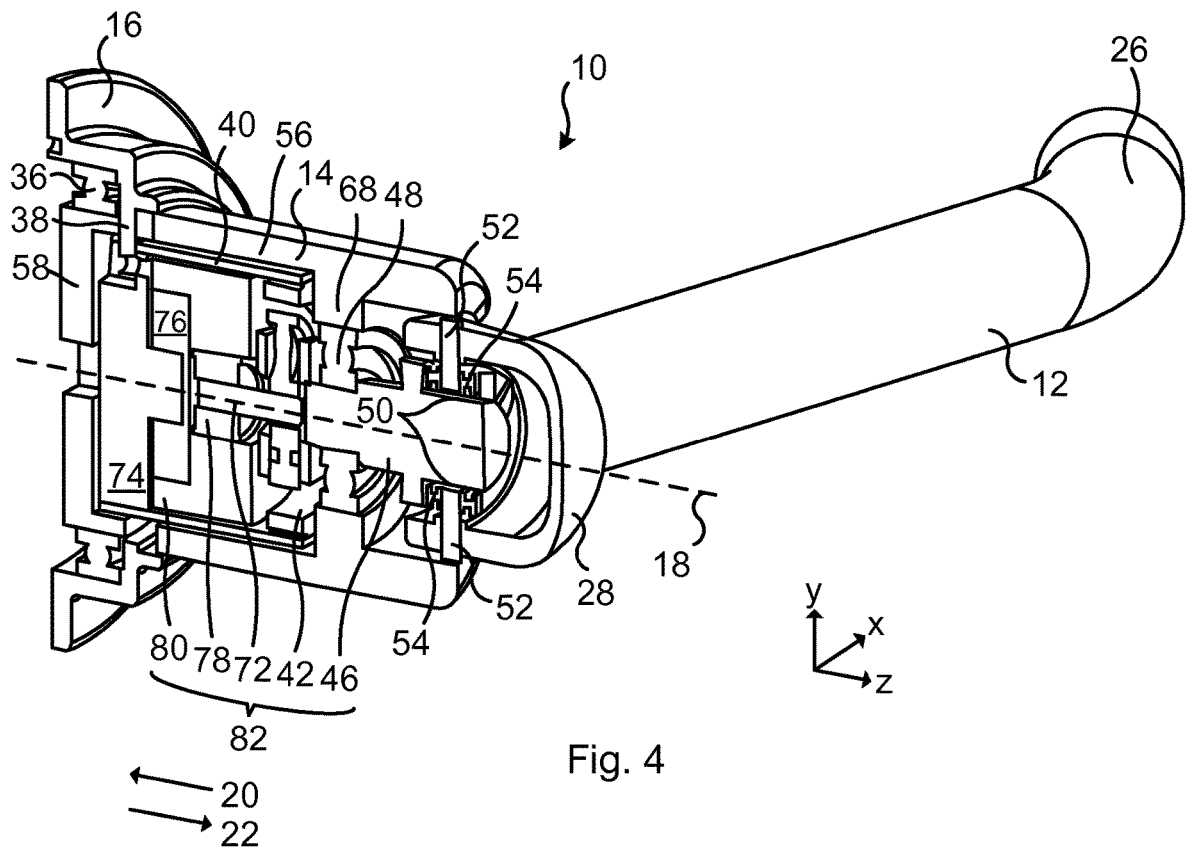
FIG. 4 schematically represents a cross sectional perspective view of the assembly where the actuating element is pulled to rotate about a second axis.

FIG. 4 schematically represents a cross sectional perspective view of the assembly 10 where the actuating element 12 is pulled to rotate about the second axis 24 (not shown in FIG. 4). In FIG. 4, the actuating element 12 is rotated approximately 30° about the second axis 24 from the neutral position in a clockwise direction as seen from above (i.e. in a plane parallel with the xz-plane).

By pulling the actuating element 12, the engaging members 52 are moved substantially in the backward direction 22. The engaging members 52 are actually rotated about the second axis 24 but due to the rather small angular displacement of the actuating element 12 about the second axis 24 and due to the arrangement of the engaging members 52 rather close to the second axis 24, the engaging members 52 are moved mainly in the backward direction 22, i.e. the movement has a dominant directional component in the backward direction 22.

As the engaging members 52 move in the backward direction 22, the cooperation of the engaging members 52 in the engageable structure 50 forces the input shaft 46 to rotate in a clockwise direction, as seen in the forward direction 20. The rotation of the input shaft 46 in the clockwise direction is transferred to the rotor 76 of the electric generator 74 (via the gearing arrangement 42, the freewheel 78 and the flywheel 80) to generate electric energy. The assembly 10 thus allows the actuating element 12 to be pulled away from the base member 16 to generate electric energy.

More specifically, pulling the actuating element 12 about the second axis 24 without turning the actuating element 12 about the first axis 18 (i.e. moving the actuating element 12 only in a plane parallel with the xz-plane), the actuating element 12 can be used to generate electric energy. Thus, the extra energy from the pull action of the actuating element 12 may be used to generate electric energy regardless of whether or not the actuating element 12 is actuated about the first axis (e.g. turned to open or close a movable access member).

Figure 5:
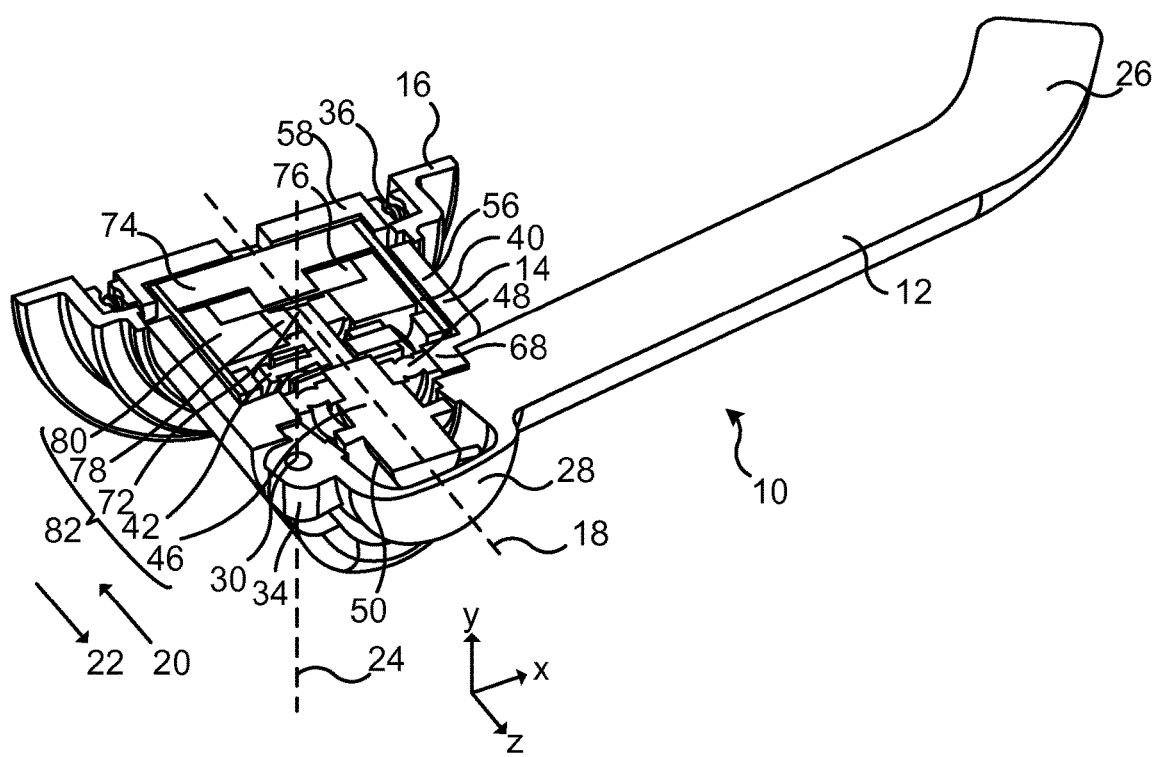
FIG. 5 schematically represents a cross sectional perspective view of the assembly where the actuating element is pushed to rotate about the second axis.

FIG. 5 schematically represents a cross sectional perspective view of the assembly 10 where the actuating element 12 is pushed to rotate about the second axis 24. In FIG. 5, the actuating element 12 is rotated approximately 30° about the second axis 24 from the neutral position in a counterclockwise direction as seen from above (i.e. in a plane parallel with the xz-plane).

From FIG. 5 it can also be gathered that the engaging members 52 are provided between the second axis 24 and the free end 26 of the actuating element 12. The distance between the first axis 18 and the free end 26 of the actuating element 12 may be from six to ten times, such as approximately eight times, the distance between the second axis 24 and the first axis 18 (i.e. the "offset distance").

By pushing the actuating element 12 towards the base member 16, the actuating element 12 is rotated about the second axis 24 such that the engaging members 52 are moved substantially in the forward direction 20. As the engaging members 52 move in the forward direction 20, the cooperation of the engaging members 52 and the engageable structure 50 forces the input shaft 46 to rotate in a counterclockwise direction, as seen in the forward direction 20. The rotation of the input shaft 46 in the counterclockwise direction is transferred to a rotation of the freewheel 78 (via the gearing arrangement 42). This rotation of the freewheel 78 is not transferred to the flywheel 80 to generate electric energy. However, by omitting the freewheel 78 and the flywheel 80 and using a bidirectional electric generator 74, also a rotation of the input shaft 46 in the counterclockwise direction may be transferred to a rotation of the rotor 76 of the electric generator 74.

Figure 6:
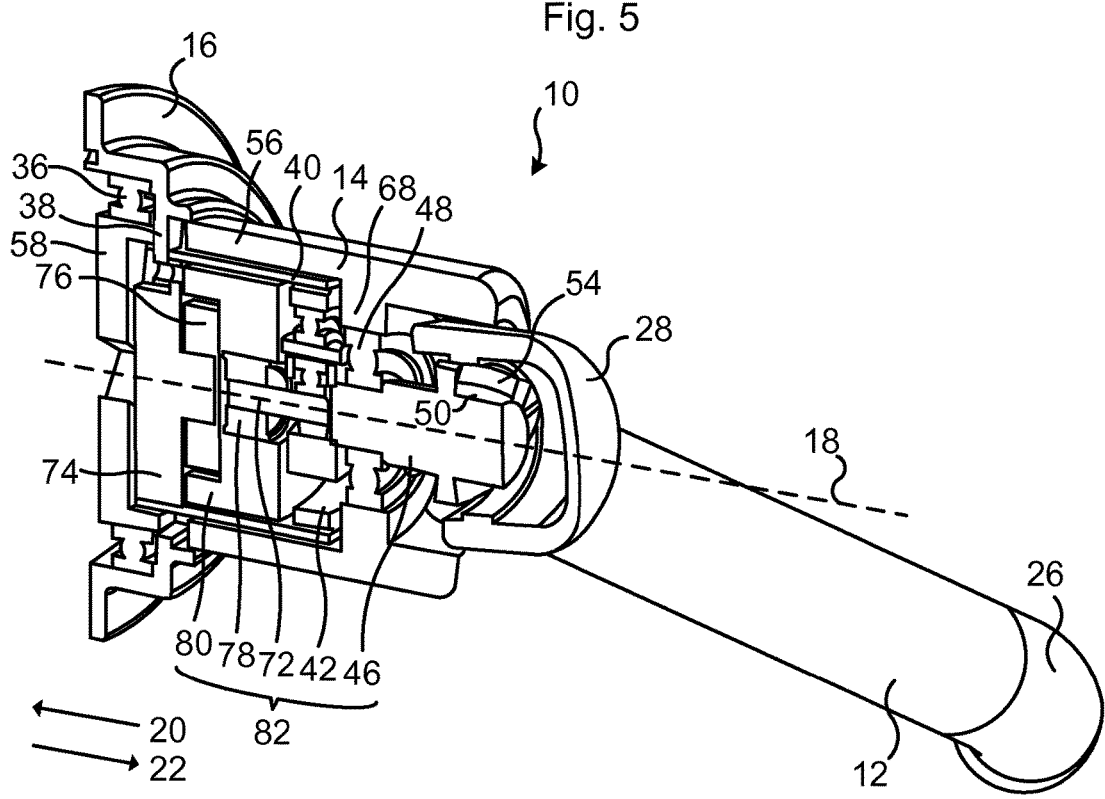
FIG. 6 schematically represents a cross sectional perspective view of the assembly where the actuating element is both pulled to rotate about the second axis and turned to rotate about a first axis.

FIG. 6 schematically represents a cross sectional perspective view of the assembly 10 where the actuating element 12 is both pulled to rotate about the second axis 24 and turned to rotate about the first axis 18. Similar to FIG. 4, in FIG. 6, the actuating element 12 is rotated approximately 30° about the second axis 24 from the neutral position in a clockwise direction as seen from above. Due to this rotation about the second axis 24, the input shaft 46 is rotated the same amount as in FIG. 4. However, since the actuating element 12 in FIG. 6 is also turned to rotate about the first axis 18 (in a clockwise direction as seen in the forward direction 20), the input shaft 46 is additionally rotated with an angle corresponding to the angular rotation of the actuating element 12 about the first axis 18. Thus, more electric energy can be generated with an actuation movement of the actuating element 12 in two planes, such as in FIG. 6, in view of the actuating movements of the actuating element 12 in FIGS. 4 and 5.

Figure 7:
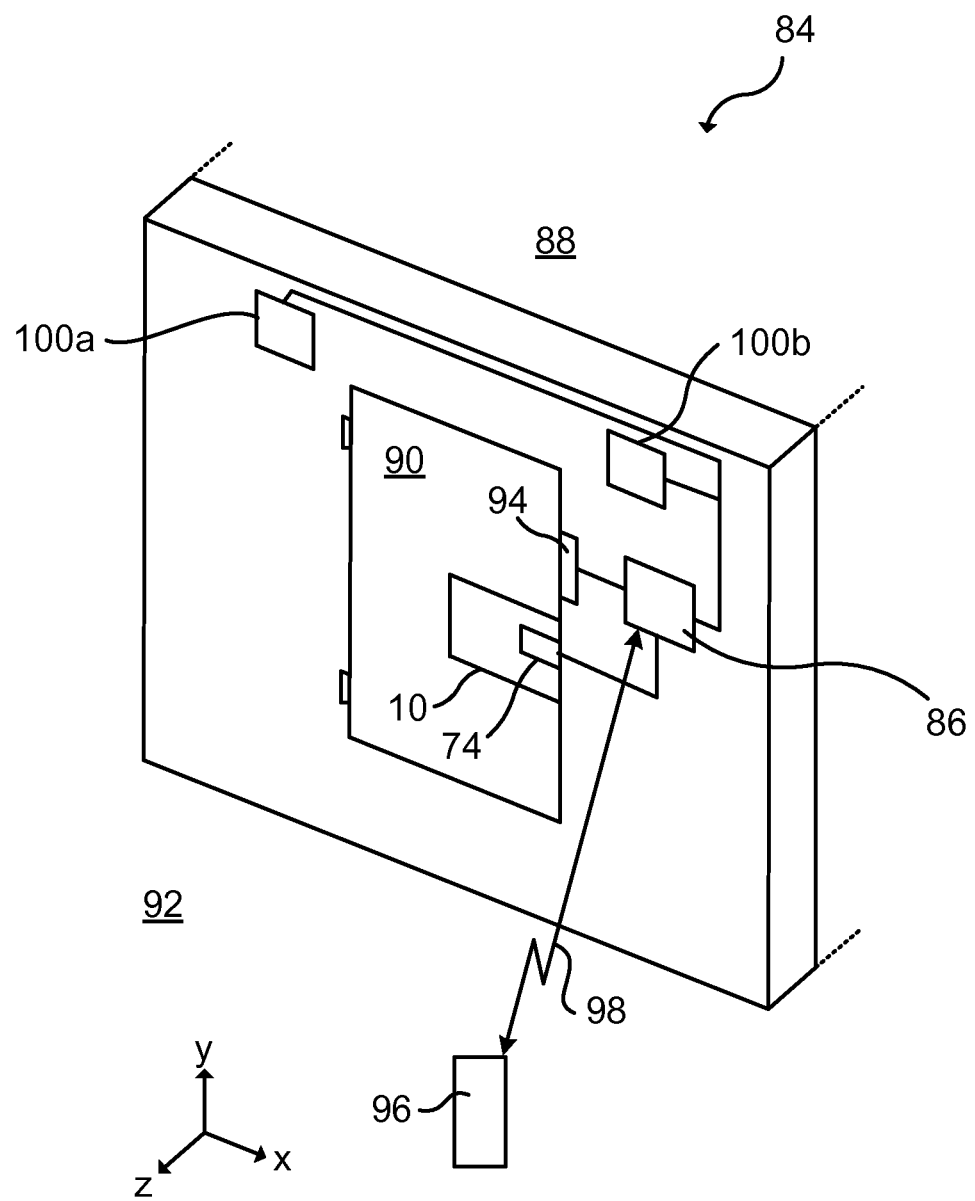
FIG. 7 schematically represents an environment in which embodiments presented herein can be applied.

FIG. 7 schematically represents an environment in which embodiments presented herein can be applied. More specifically, FIG. 7 shows an electronic locking system 84 comprising an assembly 10 according to the present disclosure and an electronic access control device 86. The access control device 86 is powerable by the electric generator 74 of the assembly 10.

Access to a physical space 88 is restricted by a movable access member 90 which is selectively unlockable. The movable access member 90 is positioned between the restricted physical space 88 and an accessible physical space 92. Note that the accessible physical space 92 can be a restricted physical space in itself, but in relation to the access member 90, the accessible physical space 92 is accessible. The movable access member 90 can be a door, gate, hatch, cabinet door, drawer, window, etc.

The electronic access control device 86 is arranged to unlock the access member 90. The access control device 86 is connected to a physical lock 94, which is controllable by the access control device 86 to be set in an unlocked state or locked state.

The access control device 86 communicates with a portable key device 96 over a wireless interface 98 using a plurality of antennas 100*a-b*. The portable key device 96 is any suitable device portable by a user and which can be used for authentication over the wireless interface 98. The portable key device 96 is typically carried or worn by the user and may be implemented as a mobile phone, smartphone, key fob, wearable device, smart phone case, RFID (Radio Frequency Identification) card, etc. In FIG. 7, two antennas 100*a-b* can be seen. However, only one antenna or more than two antennas may be provided in connection with the access control device 86. Using wireless communication, the authenticity and authority of the portable key device 96 can be checked in an access control procedure, e.g. using a challenge and response scheme, after which the access control device 86 grants or denies access.

When the access control procedure results in granted access, the access control device 86 sends an unlock signal to the lock 94, whereby the lock 94 is set in an unlocked state. In this embodiment, this can e.g. imply a signal over a wire-based communication, e.g. using a serial interface (e.g. RS485, RS232), Universal Serial Bus (USB), Ethernet, or even a simple electric connection (e.g. to the lock 94), or alternatively using a wireless interface.

When the lock 94 is in an unlocked state, the access member 90 can be opened and when the lock 94 is in a locked state, the access member 90 cannot be opened. In this way, access to a restricted physical space 88 can be controlled by the access control device 86.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An assembly for an electronic locking system, the assembly comprising:
   an actuating element constituted by a handle rotatably arrangable with respect to a base member for rotation about a first axis to open or close a movable access member and rotatably arranged about a second axis substantially perpendicular to the first axis;
   an electric generator comprising a rotor; and
   a transmission arrangement configured to transmit a rotational actuation of the actuating element about the second axis into a rotation of the rotor of the electric generator to generate electric energy.

2. The assembly according to claim 1, wherein the transmission arrangement is configured to transmit a rotational actuation of the actuating element about the first axis into a rotation of the rotor of the electric generator to generate electric energy.

3. The assembly according to claim 1, further comprising a housing rotationally coupleable to the base member for rotation about the first axis.

4. The assembly according to claim 3, wherein the actuating element is rotationally locked to the housing about the first axis.

5. The assembly according to claim 3, wherein the actuating element is rotationally coupled to the housing for rotation about the second axis.

6. The assembly according to claim 1, wherein the transmission arrangement comprises an input shaft comprising an engageable structure and the actuating element comprises at least one engaging member for engaging the engageable structure to translate an actuation of the actuating element about the second axis into a rotation of the input shaft about the first axis.

7. The assembly according to claim 6, wherein the engageable structure is constituted by at least one guide groove.

8. The assembly according to claim 6, wherein each of the at least one engaging member comprises a pin.

9. The assembly according to claim 8, wherein the assembly comprises two engaging members and wherein each pin is arranged substantially in a plane comprising the second axis and having the first axis as a normal.

10. The assembly according to claim 6, wherein each of the at least one engaging member comprises a bearing for engaging the engageable structure.

11. The assembly according to claim 6, further comprising an output shaft and a gearing arrangement between the input shaft and the output shaft configured to increase the rotational speed of the output shaft with respect to the rotational speed of the input shaft.

12. The assembly according to claim 1, wherein the transmission arrangement comprises a flywheel for driving the rotor of the electric generator and a freewheel arranged to engage the flywheel.

13. The assembly according to claim 1, wherein the actuating element is constituted by a handle.

14. The assembly according to claim 1, further comprising a base member, wherein the actuating element is rotatably arranged with respect to the base member for rotation about the first axis.

15. An electronic locking system comprising an assembly according to claim 1 and an electronic access control device powerable by the electric generator.

16. The assembly according to claim 1, wherein the electric generator is arranged within the assembly such that a rotational axis of the rotor is substantially coincident with the first axis.

17. The assembly according to claim 1, wherein the electric generator is bidirectional.

18. The assembly according to claim 1, further comprising a housing rotationally coupleable to the base member for rotation about the first axis, wherein the transmission arrangement is arranged inside the housing.

19. The assembly according to claim 1, wherein the transmission arrangement comprises an input shaft comprising an engageable structure and the actuating element comprises at least one engaging member for engaging the engageable structure to translate an actuation of the actuating element about the second axis into a rotation of the input shaft about the first axis.

20. The assembly according to claim 19, wherein the at least one engaging member is provided between the second axis and a free end of the actuating element.

* * * * *